G. W. ELLIOTT.
TRACTION WHEEL.
APPLICATION FILED MAY 10, 1913.
1,156,471. Patented Oct. 12, 1915.
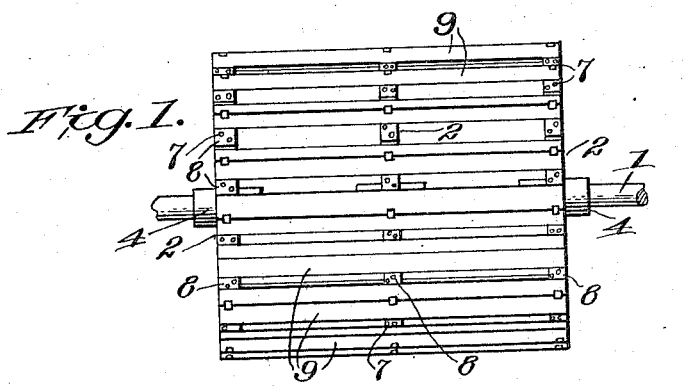
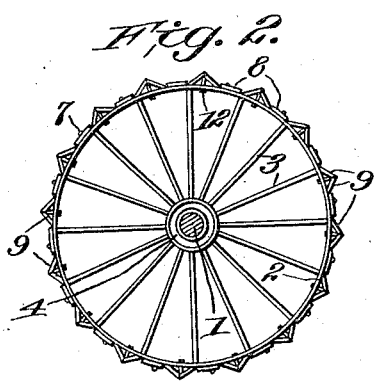
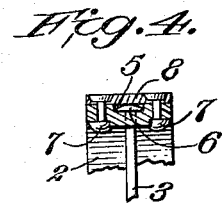
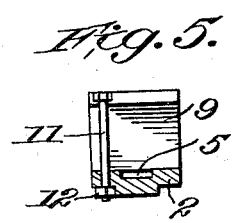
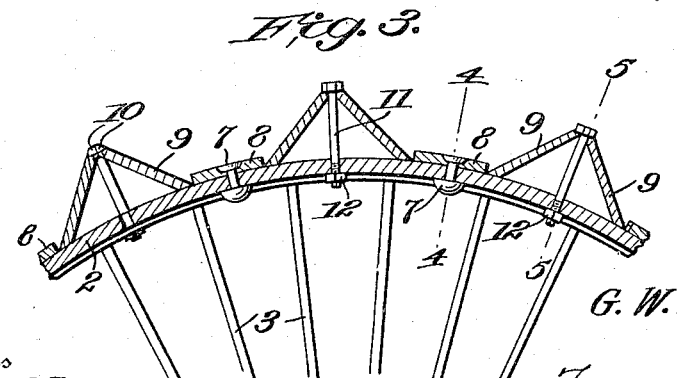
Inventor,
G. W. Elliott,
Witnesses
Frank T. Fuller
By Frank Fuller
Attorney.

UNITED STATES PATENT OFFICE.

GEORGE W. ELLIOTT, OF DE SMET, SOUTH DAKOTA.

TRACTION-WHEEL.

1,156,471.  Specification of Letters Patent.  Patented Oct. 12, 1915.

Application filed May 10, 1913. Serial No. 766,717.

*To all whom it may concern:*

Be it known that I, GEORGE W. ELLIOTT, a citizen of the United States, residing at De Smet, in the county of Kingsbury and State of South Dakota, have invented certain new and useful Improvements in Traction-Wheels, of which the following is a specification.

My invention relates to improvements in traction wheels for vehicles such as drive wheels of tractors or traction engines.

Among the objects of my invention are the provision of a wheel of this type of generally improved construction that will not become clogged by soil while in use, one that will be of light weight, one that can be constructed of steel or other metal, and one that will be strong in construction, durable in use and capable of manufacture at moderate cost.

The preferred embodiment is described hereafter in connection with accompanying drawings, any illustration of a vehicle having been omitted, as it forms no part of the present invention.

In said drawings, Figure 1 is an elevation of a traction wheel constructed in accordance with my invention. Fig. 2 is an end view thereof. Fig. 3 is a detail enlarged section taken vertically through part of the wheel at the rim. Fig. 4 is a cross section on the line 4—4 of Fig. 3. Fig. 5 is a cross section on the line 5—5 of Fig. 3.

Throughout the drawings like reference characters designate like or similar parts in the several views thereof.

Referring specifically to the drawings, the wheel body may be of any suitable type, as is obvious, and is supported upon or by an axle or shaft 1, the body comprising for instance a plurality of spaced apart rims 2, supported by spokes 3 radiating from hubs 4. The rims it will be noted, have a circumferential channel or groove 5, provided therein to receive upset heads 6 of the spokes, so as to locate them in such position as not to interfere with the fastenings to the rim of parts later to be described.

To the periphery of the rims 2 are fastened as by means of rivets 7, spaced apart transverse cleats, abutment blocks or distance pieces 8. Against opposite ends or edges of the distance pieces abut transverse spur members or angle irons or relatively to the rims 2 and that two of them are arranged intermediate each cleat 8 and are arranged in contiguous braced relation at their inner edges, thus providing pointed spur means having inclined outer or exterior faces. At the said contiguous edges are formed recesses 10 (Fig. 3.) through which are passed fastening members here in the form of bolts 11, the head being arranged beyond the recess. The bolt shank extends loosely through the adjacent rims and beyond the same receives a nut 12. Upon the nuts being properly tightened, the bolt heads press or force the spur members tightly against the adjacent edges of the blocks 8 and thus effect the formation of the traction wheels.

All of the parts described are preferably made of steel.

In addition to serving as abutment members, the cleats or blocks 8 serve as distance pieces in that they space apart the edges of the spur members that are contiguous with the blocks. The spaces thus provided prevents clogging of soil therein, permits the soil to pass through the wheel spoke at the ends should the wheel tend to clog.

Changes in the details of construction may be resorted to but are reserved so far as they fall within the spirit and scope of the appended claims.

Having thus described my said invention, what I claim as new and desire to secure by Letters Patent is:—

1. In a wheel, spur members on the periphery of the wheel, made separate from each other and arranged at an angle to each other and to the periphery of the wheel with their innermost edges contiguous to the wheel and their outermost edges contiguous to each other and distanced from the periphery of the wheel, thereby providing a spur having a pointed edge to engage the ground and having angle or inclined sides from the pointed edge toward the periphery of the wheel, abutment members on the periphery of the wheel for each spur member, and fastening means tending to spread the members at their innermost edges.

2. In a wheel, spur members on the periphery of the wheel, made separate from each other and arranged at an angle to each other and to the periphery of the wheel with their innermost edges contiguous to the wheel and their outermost edges contiguous to each other and distanced from the periphery of the wheel thereby providing a spur having a hollow portion for the purpose specified and having a pointed edge to engage the ground and having angle or inclined sides from the pointed edge toward the periphery of the wheel, cleats on the periphery of the wheel, one cleat for each spur member, said spur members adjacent their innermost edges abutting said cleats, and a fastening bolt passing through said periphery of the wheel and intermediate the spur members having a head engaging both of said members.

In testimony whereof I affix my signature in presence of two witnesses.

GEORGE W. ELLIOTT.

Witnesses:
A. S. ALQUIST,
WM. H. WARREN.

Copies of this patent may be obtained for five cents each, by addressing the "Commissioner of Patents, Washington, D. C."